United States Patent [19]
Krude

[11] 4,280,341
[45] Jul. 28, 1981

[54] TELESCOPIC DRIVE SHAFT

[75] Inventor: Werner Krude, Neunkirchen, Fed. Rep. of Germany

[73] Assignee: Uni-Cardan AG, Lohmar, Fed. Rep. of Germany

[21] Appl. No.: 5,707

[22] Filed: Jan. 23, 1979

[30] Foreign Application Priority Data

Feb. 4, 1978 [DE] Fed. Rep. of Germany ....... 2804778

[51] Int. Cl.³ .............................................. F16D 3/06
[52] U.S. Cl. ...................................... 64/23; 308/200; 403/355; 403/109
[58] Field of Search ................. 64/23, 23.5, 23.7, 9 A, 64/11 R, 14, 8; 308/200, 206; 403/355, 109

[56] References Cited
U.S. PATENT DOCUMENTS

| | | | |
|---|---|---|---|
| 1,188,606 | 6/1916 | Barker et al. | 64/23 |
| 1,443,115 | 1/1923 | Breese | 308/200 |
| 2,592,103 | 4/1952 | Alfredeen | 64/23 |
| 2,795,398 | 6/1957 | Ragland | 64/23 |
| 3,020,736 | 2/1962 | Babelay | 64/8 |
| 3,106,077 | 10/1963 | Sharp | 64/8 |
| 3,797,276 | 3/1974 | Orain | 64/23.7 |
| 4,060,252 | 11/1977 | Mowery | 308/200 |

FOREIGN PATENT DOCUMENTS 1219291  6/1966  Fed. Rep. of Germany .

Primary Examiner—Ira S. Lazarus
Assistant Examiner—Magdalen Moy
Attorney, Agent, or Firm—Toren, McGeady and Stanger

[57] ABSTRACT

A telescopic drive shaft includes an axially extending inner shaft member slidably supported within an axially extending tubular shaped outer shaft member. Rolling bodies are mounted in one or a plurality of support members secured to the inner or outer shaft member. The rolling bodies project and roll along axially extending grooves in the other of the inner and outer shaft members. The rolling bodies provide relative sliding movement between the shaft members and also effect torque transmission between the shaft members. Each rolling body extends into at least one ring-shaped recess in its support member and guide balls located in the recess support the rolling body. Each recess is located in a plane parallel to the axis of the drive shaft, at least three guide balls are located in each recess, though a full ring of guide balls can be used.

5 Claims, 7 Drawing Figures

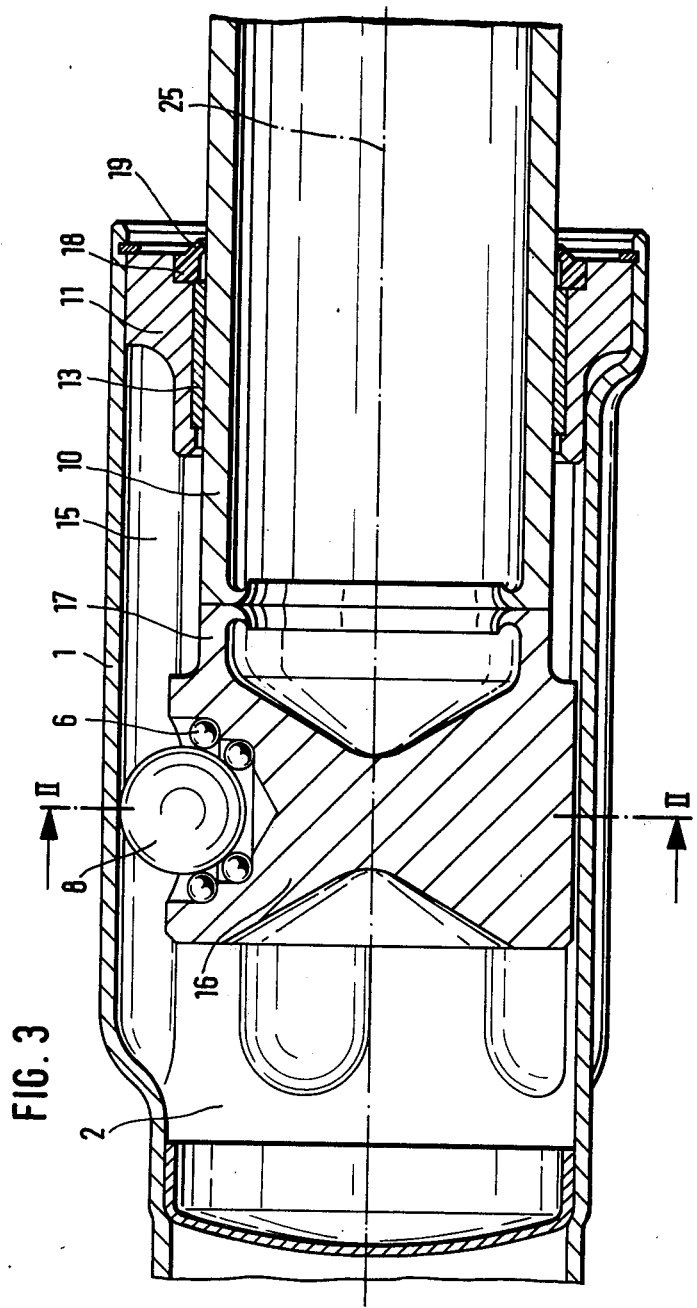

TELESCOPIC DRIVE SHAFT

SUMMARY OF THE INVENTION

The present invention is directed to a telescopic drive shaft consisting of an inner shaft member axially slidably guided in a tubular outer shaft member and rolling bodies extend between the inner and outer shaft members for guiding the axial movement and also for transmitting torque. The rolling bodies are held and guided within one or more support members located in one of the inner and outer shaft members.

Telescopic shafts are known, note German Pat. No. 1,219,291, in which the danger of breaking a telescoping section of the shaft due to seizing is reduced, even in the case of high or peak torques, by filling the annular hollow space within the shaft with oil. Such ball guidance is very cumbersome and is effective only with considerable additional seals. When leaks develop in the system, oil loss and the penetration of dirt is to be expected and, accordingly, trouble-free ball guidance is no longer ensured. When the sealing arrangement is damaged, during further operation, seizing of the sectional parts must be expected with the resulting danger of breakage occurring in the telescopic shaft.

In view of the prior art, it is the primary object of the present invention to provide a telescopic drive shaft which provides, in a simple arrangement, the guidance of the rolling bodies which effect torque transmission. The rolling bodies are guided so that there is only low friction developed during the sliding movement of the shaft parts with the rolling bodies which provide torque transmission rolling between the inner and outer shaft parts during telescopic movement.

In accordance with the present invention, each rolling body is supported within a support member by at least three guide balls with the guide balls located in annular recesses in the support member.

This arrangement has the advantage that, if peak torques are developed, possible seizing of the telescoping shaft sections is prevented because the rolling bodies continue to roll between the outer and inner shaft members, even under the influence of increasing friction caused by the peak torques, and a low friction is maintained due to the use of the guide balls. Overall, a smooth running operation of the entire telescopic shaft is achieved.

Another essential feature of the present invention is that, in addition to the annular arrangement of the recesses, each recess is located in a plane extending parallel to the axial direction of the shaft members.

In such a telescopic shaft construction, the surface pressure and the friction can be reduced by placing more than three balls in each of the annular recesses or grooves. Each recess can be completely filled with guide balls so that a closed ring of the guide balls is formed. This feature results in very advantageous friction coefficients and, additionally, the surface pressure is distributed over all of the guide balls.

To attain an economical production of the support member or members in which the guide balls are positioned, in another feature of the present invention, the support members are constructed as separate components each fitted into and secured within one of the shaft members.

For the transmission of larger torques, in accordance with another essential feature of the invention, each rolling body is supported within several recesses which are arranged in spaced parallel relation. It is advantageous and, as far as production is concerned, possible without any difficulty to arrange the guide balls for each rolling body in several recesses each located in a different parallel plane. With this arrangement especially advantageous values of the friction between the rolling bodies and the shaft members is obtained and low surface pressure is developed during torque transmission.

Moreover, the recesses holding the guide balls can be constructed as bores or grooves in the support member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is an axially extending sectional view similar to FIG. 1, illustrating another embodiment of a telescopic drive shaft, however, with the rolling bodies held in the inner shaft member;

DETAIL DESCRIPTION OF THE INVENTION

Figure 1:
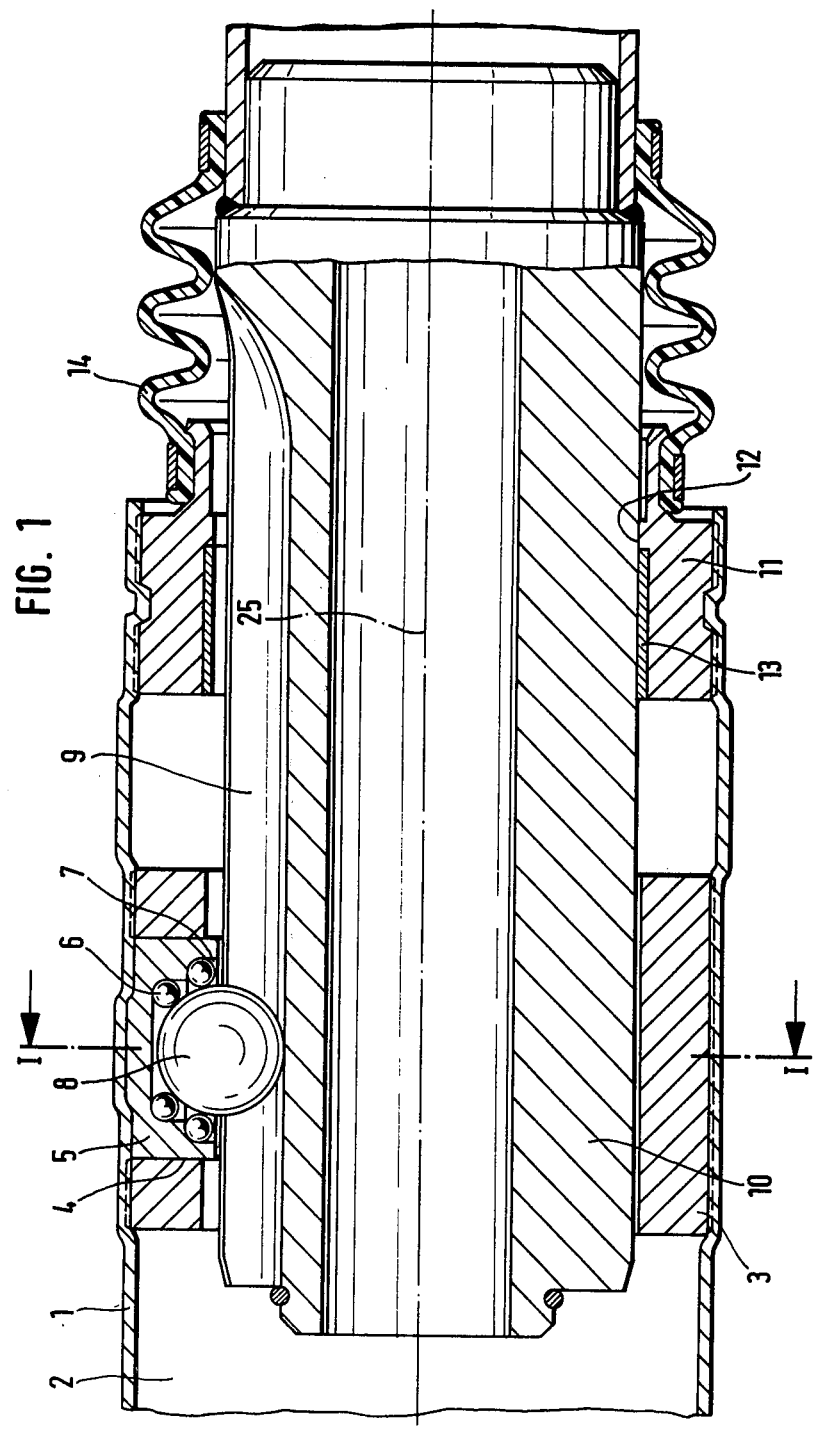
FIG. 1 is an axially extending sectional view of a portion of a telescopic drive shaft.
Figure 2:
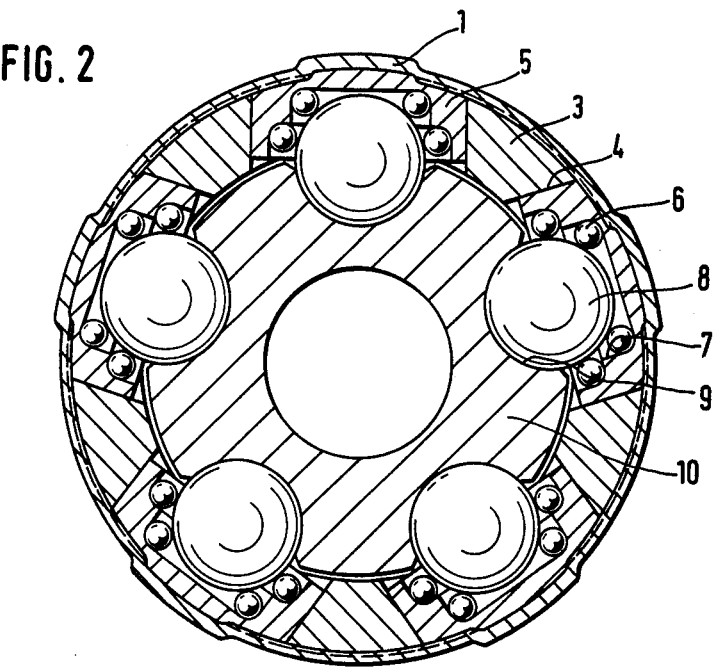
FIG. 2 is a sectional view taken along the line I-I in FIG. 1.

In FIGS. 1 and 2 a telescopic drive shaft is illustrated which consists essentially of an axially extending tubular shaped outer shaft member 1 forming a hollow cylindrical space 2 with a ring 3 secured to and extending around the inside of the outer shaft member. A plurality of recesses 4 are spaced angularly apart around the circumference of the ring 3 and a support member 5 is held in each of the recesses. The support members 5 are fixed directly to the inner surface of the outer shaft member 1 and, on one hand, hold a number of guide balls 6 within grooves or recesses 7, in the support member and, on the other hand, support the rolling bodies 8 which transmit torque between the sections of the telescopic drive shaft. The rolling bodies 8, in the form of balls in this embodiment, are arranged in the recesses 7 of each support member and the guide balls 6 within the recesses provide an exact support for the rolling bodies. Moreover, each rolling body is guided within an axially extending groove 9 formed into the outer surface of inner shaft member 10. Grooves 9 extend parallel to the axis of the inner shaft member 10 and serve for the relative shifting or sliding movement between the inner shaft member 10 and the outer shaft member 1 so that the rolling bodies are held in the corresponding support members 5 and the inner shaft member 10 can perform a relative movement along the rolling bodies 8 in the grooves 9.

In this embodiment, to provide axial stability, an additional ring 11 is secured within the inner surface of the outer shaft member 1 and encircles the inner shaft member 10. The bore 12 in the ring 11 slides on the outer surface of the inner shaft member 10 with the aid of a sliding layer 13 located in the bore 12. It would be possible, however, to position another ring 3 at the location of the ring 11, provided with additional support members 5 and rolling bodies 8.

To seal the hollow space 2 within the outer shaft member 1 from the atmosphere and also to prevent the penetration of dust and dirt, a sealing boot 14 is mounted on the outer shaft member 1 and on the inner shaft member 10.

To keep the friction down and to increase the guidance of the rolling bodies 8, in the embodiment illustrated, two recesses 7 are provided in the support member 5 with the recesses located in spaced planes so that several guide balls 6 in each recess, located in different planes, support the rolling bodies 8 which provide the torque transmission between the shaft sections.

Figure 4:
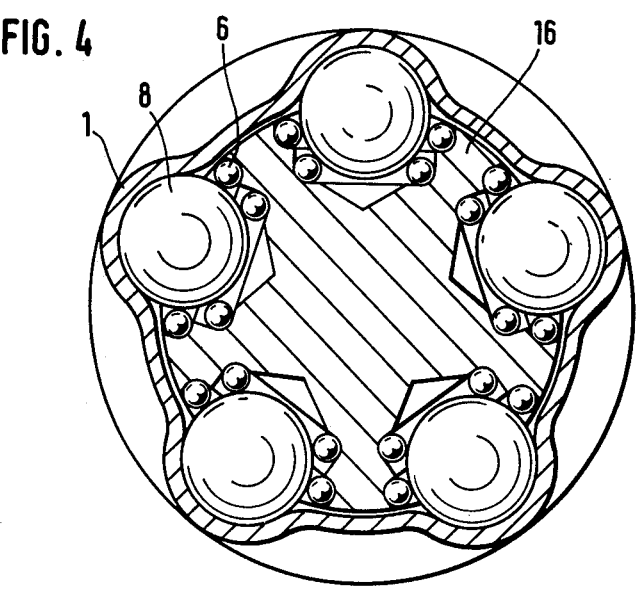
FIG. 4 is a sectional view taken along the line II-II of FIG. 3.

FIGS. 3 and 4 display another embodiment of a telescopic drive shaft designed on the same basic concept as the embodiment in FIGS. 1 and 2. The difference between the two embodiments is that the grooves 15 in FIGS. 3 and 4 are located in the outer shaft member 1 and these grooves 15 serve to accommodate the sliding movement of the telescopic shaft in its axial direction. Rolling bodies 8 which transmit the torque between the outer and inner shaft members 1, 10 are arranged in recesses 7 in a unitary support member 16 secured to the end of the inner shaft member 10. For attaching the support member 16 to the inner shaft member 10, it is provided with a cylindrical extension 17 on the end facing toward the inner shaft member. The extension 17 has a wall thickness corresponding to the wall thickness of the inner shaft member 10. The connection between the extension and the inner shaft member can be effected, for example, by welding. In this embodiment, the axial stability of the telescopic drive shaft is ensured by a ring 11 fixed to the outer shaft member 1 and guiding the inner shaft member 10 within a sliding layer 13 located in its radially inner surface. The hollow space 2 within the drive shaft is sealed by a sealing ring 18, one end of which is provided with a stripping ring 19. The support member 16 is constructed to provide the same function as the individual support members 5. The support member 16 has a pair of recesses for each rolling body 8 with the recesses located in spaced parallel planes and with guide balls located in each recess and providing a support for the rolling body.

It will also be possible to provide an embodiment similar to that shown in FIG. 3 where the individual support members 5 are directly inserted into the inner shaft member 10.

Figure 5:
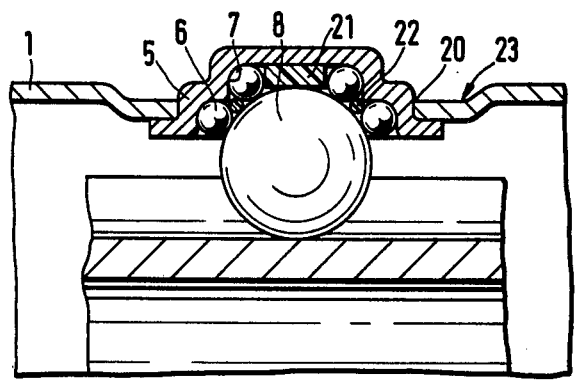
FIG. 5 is a detail view, on an enlarged scale, of a support member for a rolling body.
Figure 6:
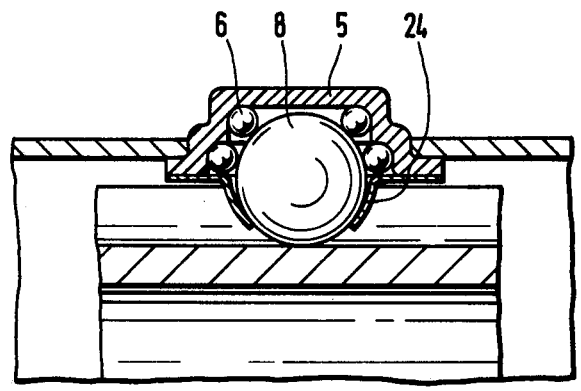
FIG. 6 is a sectional view similar to FIG. 5 showing another embodiment of a support member for a rolling body, with the view shown on an enlarged scale.

FIGS. 5 and 6 exhibit alternate constructions of the support members 5. In FIG. 5, the support member 5 is constructed as a deep-drawn sheet metal part, the recesses 7 are formed directly in the part so that the guide balls 6 roll in the recesses. This embodiment ensures a simple assembly, since the support member can be inserted into and fastened within a bore 20 in the outer shaft member 1. Rubber elements 21, 22 located within the recesses 7 in the support member serve to dampen any noise generated as a result of dimensional differences within the support members. The noise can also be dampened, however, by means of an inwardly deformed pocket pressed into the outer shaft member 1, since in this case resilience of the material can be expected.

The support member 5 illustrated in FIG. 6 is formed in the same manner as the one shown in FIG. 5, however, in this case, an additional sheet metal part 24 is provided on the support member so that it holds the rolling body within the support member. Accordingly, the support member can be assembled as a unit including the drive balls 6 and a rolling body 8 for subsequent insertion into the telescopic drive shaft as needed.

Figure 7:
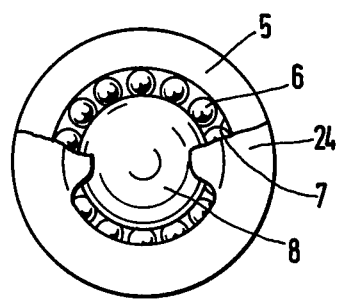
FIG. 7 is a bottom view, partly broken away, of the support member shown in FIG. 6.

The support member 5 illustrated as a detail in FIG. 7, shows how a ball 8 is supported by a ring of guide balls 6 which are arranged around the entire circumference of the recess 7. In FIG. 7 only one plane of the drive balls 6 is shown, however, from the illustration provided in FIGS. 5 and 6 it can be noted that the drive balls 6 are arranged in adjacent parallel planes.

While specific embodiments of the invention have been shown and described in detail to illustrate the application of the inventive principles, it will be understood that the invention may be embodied otherwise without departing from such principles.

What is claimed is:

1. Telescopic drive shaft comprising an axially extending tubular shaped outer shaft member, an axially extending inner shaft member located within said outer shaft member with the axes of said inner and outer shaft members disposed in substantially parallel relation, rolling bodies located within said outer shaft member and extending between said outer shaft member and inner shaft member for effecting axially sliding movement of said inner shaft member relative to said outer shaft member and for effecting torque transmission between said inner and outer shaft members, said rolling members being mounted in at least one support member secured to one of said inner and outer shaft members and movably supported in grooves formed in the other one of said inner and outer shaft members, wherein the improvement comprises that said at least one support member has at least one recess formed therein for each said rolling body and at least three guide balls located in each said recess for supporting said rolling body associated therewith, said outer shaft member includes a first ring concentric with said inner shaft member with the radially inner surface of said ring spaced closely outwardly from the outer surface of said inner shaft member, said first ring having bores formed therein spaced axially apart around the inner circumference of said ring, said at least one support member comprises one said support member secured in each bore in said ring, each said support member having two concentric recesses formed therein for each said rolling body with at least three said guide balls in each said recess, and said recesses in each said support member being located in spaced planes extending parallel to one another and to the axes of said inner shaft member.

2. Telescopic drive shaft, as set forth in claim 1, wherein said inner shaft member has a plurality of axially extending grooves formed in the outer surface thereof with said grooves being parallel with the axis of said inner shaft member and corresponding in number to said support members with one said groove aligned opposite each of said support members, a second ring concentric with said inner shaft member and spaced in the axial direction of said inner shaft member from said first ring, the radially inner surface of said second ring being disposed in sliding contact with the outer surface of said inner shaft member whereby said second ring provides axially stability for the drive shaft.

3. Telescopic drive shaft, as set forth in claim 1, wherein each recess is completely filled with a ring of said guide balls with the adjacent said guide balls being disposed in surface contact.

4. Telescopic drive shaft, as set forth in claim 1, wherein each said support member comprises a separate support component comprising a deep-drawn sheet metal part secured into said first ring, said sheet metal part having a pair of stepped recesses therein each located in a plane parallel to the plane of the other and parallel to the axis of said inner shaft member, each of the stepped recesses being concentric and having a different diameter with the outer circumferential periphery of each of said recesses being circular and affording a supporting surface for said guide balls.

5. Telescopic drive shaft, as set forth in claim 4, wherein a ring of said guide balls is located in each of the stepped recesses with adjacent said guide balls disposed in surface contact with one another.

* * * * *